United States Patent
Puvak

(10) Patent No.: US 10,512,217 B2
(45) Date of Patent: Dec. 24, 2019

(54) METERING FLOW OF GRAIN TO A CLEANING DEVICE

(71) Applicant: Deere & Company, Moline, IL (US)

(72) Inventor: Jared A. Puvak, Moline, IL (US)

(73) Assignee: Deere & Company, Moline, IL (US)

( * ) Notice: Subject to any disclaimer, the term of this patent is extended or adjusted under 35 U.S.C. 154(b) by 139 days.

(21) Appl. No.: 15/684,011

(22) Filed: Aug. 23, 2017

(65) Prior Publication Data

US 2019/0059221 A1 Feb. 28, 2019

(51) Int. Cl.
*A01D 41/127* (2006.01)
*A01F 12/44* (2006.01)

(52) U.S. Cl.
CPC ...... *A01D 41/1276* (2013.01); *A01D 41/1272* (2013.01); *A01F 12/44* (2013.01)

(58) Field of Classification Search
CPC ............ A01D 41/1272; A01D 41/1276; A01F 12/44–448; A01F 12/184
See application file for complete search history.

(56) References Cited

U.S. PATENT DOCUMENTS

| | | | | |
|---|---|---|---|---|
| 4,253,471 A * | 3/1981 | Klimmer | .................. | A01F 12/44 460/100 |
| 4,751,932 A | 6/1988 | Busboom | | |
| 5,795,223 A * | 8/1998 | Spiesberger | .......... | A01F 12/448 460/102 |
| 6,119,442 A * | 9/2000 | Hale | .................. | A01D 41/1277 56/10.2 H |
| 6,591,145 B1 | 7/2003 | Hoskinson | | |
| 6,726,559 B2 | 4/2004 | Bischoff | | |
| 6,932,697 B2 | 8/2005 | Baumgarten et al. | | |
| 7,001,267 B2 | 2/2006 | Behnke et al. | | |
| 7,630,808 B2 * | 12/2009 | Behnke | ................. | A01D 41/127 56/10.2 F |
| 7,645,190 B2 * | 1/2010 | Schwinn | ............ | A01D 41/1276 460/6 |
| 7,846,013 B1 * | 12/2010 | Diekhans | .............. | A01F 12/448 460/1 |
| 8,282,453 B1 * | 10/2012 | Hillen | ..................... | A01F 12/52 340/684 |
| 8,777,706 B2 * | 7/2014 | Farley | .................. | A01D 75/282 460/101 |
| 8,968,064 B2 * | 3/2015 | Kile | ........................ | A01F 12/58 460/4 |

(Continued)

FOREIGN PATENT DOCUMENTS

EP 2612548 A1 7/2013
EP 2845461 A1 3/2015

(Continued)

OTHER PUBLICATIONS

EP Application No. 18189470.0 Extended European Search Report dated Jan. 23, 2019, 5 pages.

*Primary Examiner* — Robert E Pezzuto
*Assistant Examiner* — Adam J Behrens
(74) *Attorney, Agent, or Firm* — Joseph R. Kelly; Kelly, Holt & Christenson PLLC

(57) ABSTRACT

A delivery device is located at an inlet side of the cleaning shoe in a combine harvester. The delivery device is controlled in order to control a feed rate of grain that is fed to the cleaning shoe. One or more controllable subsystems are controlled based upon the feed rate.

17 Claims, 7 Drawing Sheets

(56) References Cited

U.S. PATENT DOCUMENTS

| | | | | |
|---|---|---|---|---|
| 9,011,222 | B2* | 4/2015 | Johnson | A01D 41/127 460/1 |
| 9,445,546 | B2* | 9/2016 | May | A01D 75/282 |
| 9,615,511 | B2* | 4/2017 | Johnson | A01D 41/127 |
| 9,814,184 | B2* | 11/2017 | Ricketts | A01D 75/282 |
| 2007/0281764 | A1* | 12/2007 | Schwinn | A01D 41/1276 460/6 |
| 2013/0116018 | A1* | 5/2013 | Ricketts | A01D 75/282 460/9 |
| 2014/0277960 | A1 | 9/2014 | Blank et al. | |
| 2015/0156971 | A1* | 6/2015 | May | A01D 41/1276 460/1 |
| 2016/0345501 | A1* | 12/2016 | Baert | A01F 12/448 |

FOREIGN PATENT DOCUMENTS

| | | |
|---|---|---|
| WO | 2015028437 A1 | 3/2015 |
| WO | 2017040261 A1 | 3/2017 |

\* cited by examiner

METERING FLOW OF GRAIN TO A CLEANING DEVICE

FIELD OF THE DESCRIPTION

The present description relates to a harvester. More specifically, the present description relates to metering grain delivery to a cleaning device in a harvester.

BACKGROUND

There are a wide variety of different types of agricultural machines. Such machines include combine harvesters (or combines). A combine harvester extracts grain from a field and moves it through a variety of different devices in the combine. For instance, the grain can be moved to a separator and then to a cleaning shoe. After the grain is cleaned at the cleaning shoe, it is often then moved to a clean grain tank.

The cleaning shoe has a number of different controllable subsystems which can be set to operate differently, under different harvesting conditions. Some of the controllable subsystems can include the fan speed of a cleaning shoe fan, as well as the size of openings in the sieve and chaffer portions of the cleaning shoe. Often, combine harvesters have a variety of different sensors that sense variables, such as grain loss, etc. These sensor signals are monitored to control different controllable subsystems in the cleaning shoe based upon the sensed variable.

However, the performance of the cleaning shoe also varies based upon the rate at which grain is fed into the cleaning shoe. The feed rate of the grain provided to the cleaning shoe may vary widely, based upon slight changes in machine speed, whether the machine is traveling uphill or downhill, differences in the crop yield at different locations in the field, among a wide variety of other things.

The discussion above is merely provided for general background information and is not intended to be used as an aid in determining the scope of the claimed subject matter.

SUMMARY

A delivery device is located at an inlet side of the cleaning shoe in a combine harvester. The delivery device is controlled in order to control a feed rate of grain that is fed to the cleaning shoe. One or more controllable subsystems are controlled based upon the feed rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As briefly mentioned above, the feed rate or flow rate, of material through a combine harvester is highly variable. It can vary based upon a wide variety of different factors. Some current systems attempt to sense variables and control the feed rate through the entire machine by adjusting the ground speed of the machine. However, the feed rate of material through the machine may vary based upon the particular location of the material within the machine.

Also, individual components of the machine may be controlled based upon sensed variables. For instance, in some current systems, grain loss is sensed by various loss sensors on the machine and the machine ground speed is then controlled based upon the grain loss, to modify the feed rate of grain through the machine, to reduce loss. However, by the time the grain loss is sensed, and the ground speed is modified, the machine may have harvested 30-40 feet in the field.

Similarly, certain mechanisms within the machine may operate differently based upon the feed rate of material through the machine. For instance, the cleaning shoe (such as the sieve and chaffer openings and cleaning shoe fan speed) may operate well at one feed rate (the rate at which material is fed into the cleaning shoe) but not at a second feed rate. Thus, if the feed rate changes, it may be desirable to change the settings for the cleaning shoe. Because the feed rate of material entering the cleaning shoe varies widely, it can be difficult to modify the settings accordingly.

By way of example, as a harvester moves through a field, the feed rate into the cleaning shoe may be relatively high. However, as the harvester moves to a position in the field where the crop flow through the machine slows down (such as where the machine is turning at the end of a field and is easing into another cut across the field) this may lead to relatively high cleaning shoe losses because the cleaning shoe has settings which are optimized for regular, relatively heavy, crop flow in the field.

The present system thus senses and controls the feed rate of material entering the cleaning shoe. In one example, the material that is about to be fed into the cleaning shoe is accumulated and metered so that a desired feed rate can be obtained. The accumulator may be a separate hopper or a delivery device that actually delivers the material into the cleaning shoe. The feed rate can be sensed and cleaning shoe settings can be generated based upon the sensed feed rate of material into the cleaning shoe.

Figure 1:
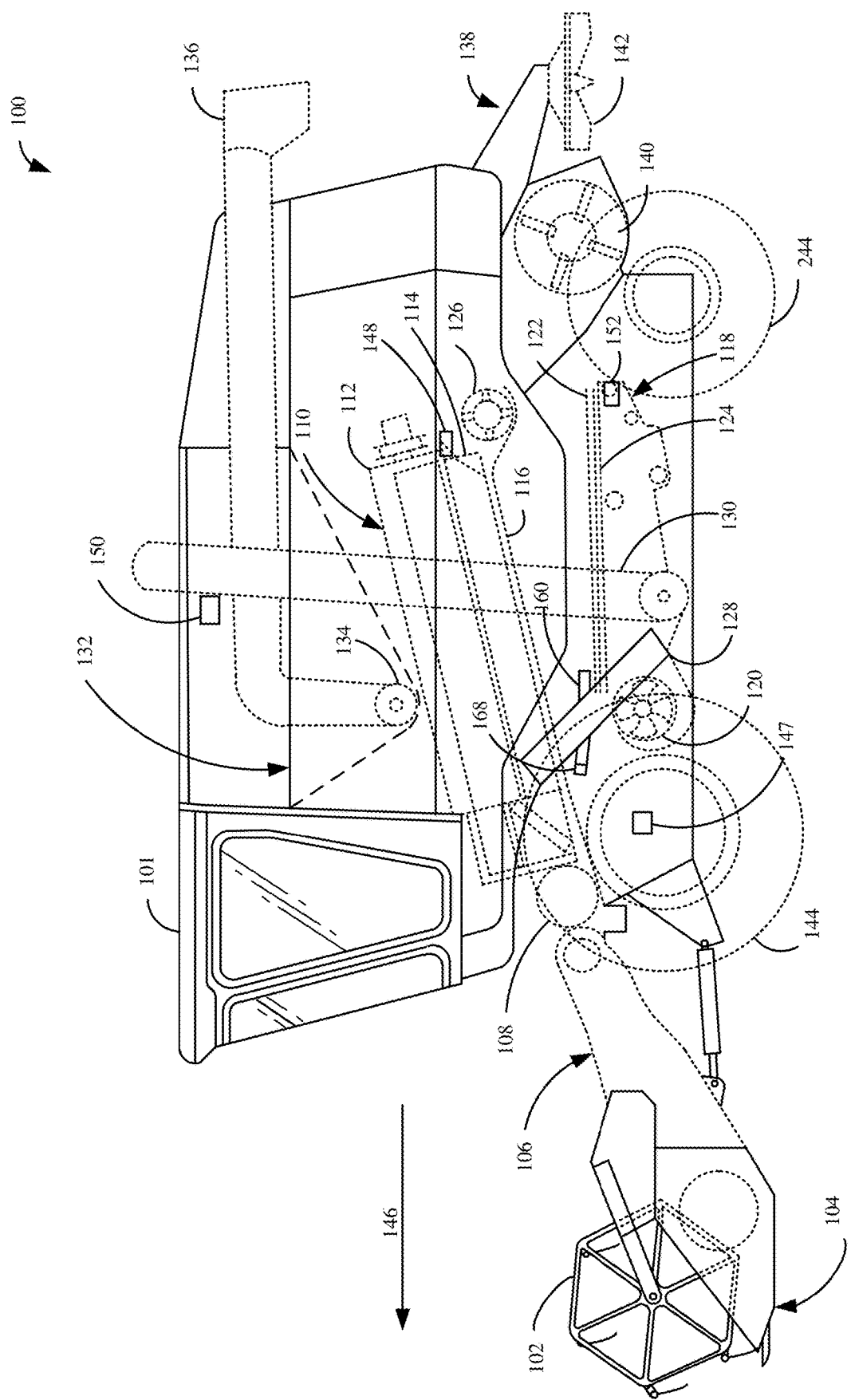
FIG. 1 is a partial pictorial, partial schematic view of one example of a combine harvester.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Harvested material, such as grain and material other than grain (MOG) from separator 116 can be accumulated by an accumulator 168 and moved to an inlet side of cleaning shoe (or cleaning subsystem) 118 at a desired feed rate. The feed rate can be sensed and/or controlled and various subsystems in cleaning shoe 118 and/or on harvester 100, can be controlled based on the feed rate of material into cleaning shoe 118. Some examples of this are described in more detail below.

Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels into cleaning shoe 118 and/or through clean grain elevator 130. They can sense mass flow rate of grain or provide other output signals indicative of other sensed variables. Some additional examples of the types of sensors that can be used are described below.

Figure 2:
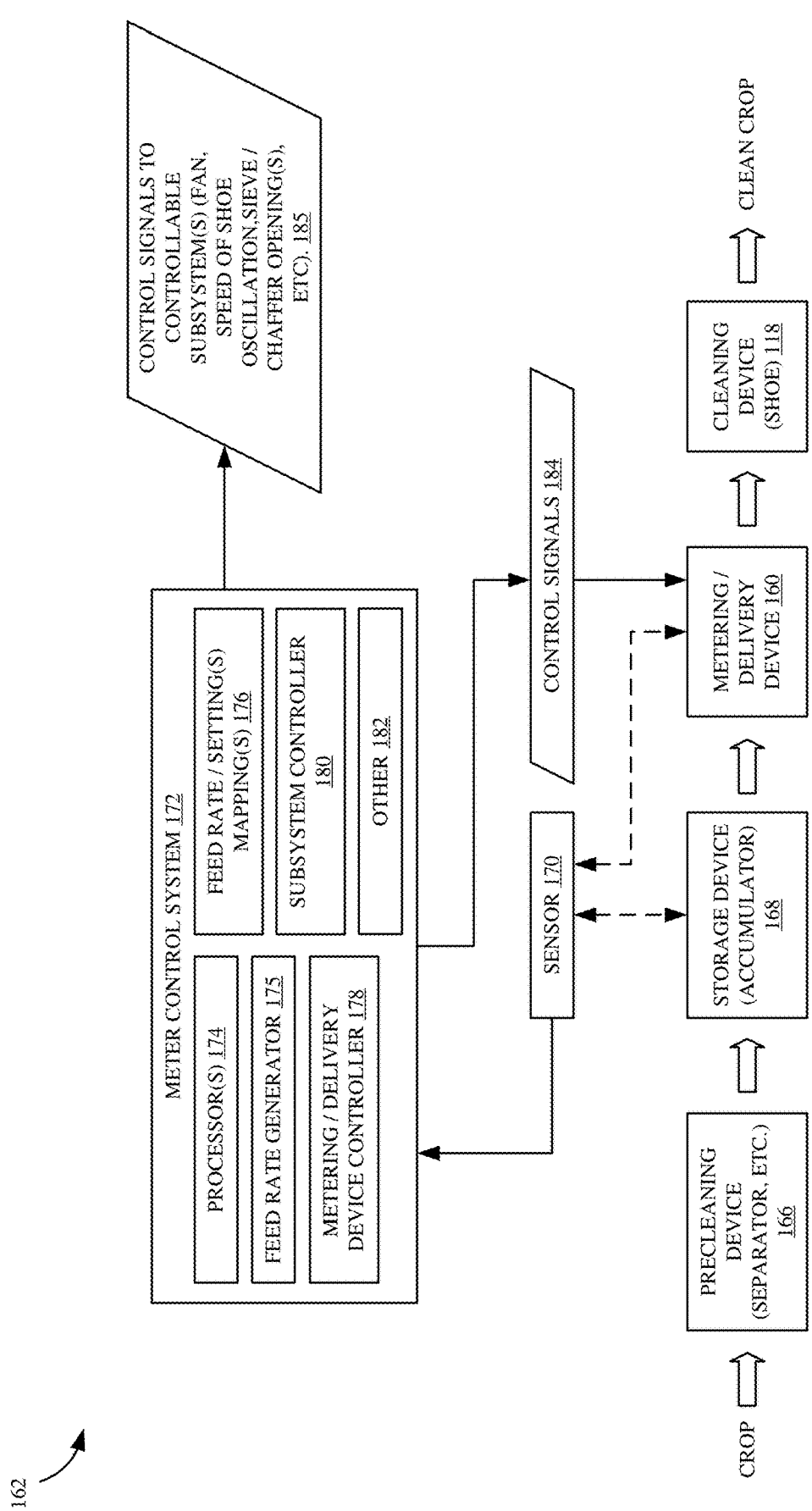
FIG. 2 is one example of a block diagram showing some items of the combine harvester illustrated in FIG. 1, in addition to a meter control system, in more detail.

FIG. 2 shows a block diagram of one example of a control system architecture 162 that controls delivery of crop to a cleaning shoe 118, at a desired feed rate. The crop is illustratively provided to a precleaning device (such as separator 116 in FIG. 1). The precleaned crop is then provided to a storage device 168 which can be a hopper, or another type of accumulator (some examples of which are described in greater detail below). The amount of grain in storage device 168 is sensed by sensor 170 and the grain is moved from storage device 168 to an inlet side of cleaning shoe 118 by metering/delivery device 160. It will be noted that, as is described in more detail below, the metering/delivery device 160 may also serve as the storage device or accumulator 168. Again, some examples of this are described below with respect to FIGS. 4-5.

The amount of grain in storage device 168, that is sensed by sensor 170, is provided to meter control system 172. Meter control system 172, itself, includes one or more processors 174, feed rate generator 175, feed rate-to-settings mappings 176, metering/delivery device controller 178, subsystem controller 180 and it can include other items 182. Based upon the amount of grain accumulating in accumulator 168, feed rate generator 175 identifies a feed rate at which grain should be provided (using metering/delivery device 160) from storage shoe 118 to cleaning shoe 118. Processor 174 then accesses the feed rate-to-settings mappings 176 to identify a group of settings that can be applied to metering/delivery device 160 in order to control the feed rate with which device 160 moves grain into cleaning shoe 118. Metering/delivery device controller 178 generates control signals 184 to apply those settings to device 160. Subsystem controller 180 also illustratively generates control signals 185 that can be applied to other controllable subsystems, based upon the feed rate of grain being delivered to cleaning shoe 118. For instance, subsystem controller 180 illustratively generates control signals to control the sieve and chaffer openings in cleaning shoe 118. It also illustratively generates fan speed controls signals to control the speed of cleaning shoe fan 120. It can generate oscillation control signals to control a speed of oscillation of the cleaning shoe 118. It can generate a wide variety of other control signals as well, such as to control the machine speed of harvester 100, etc.

Figure 3:
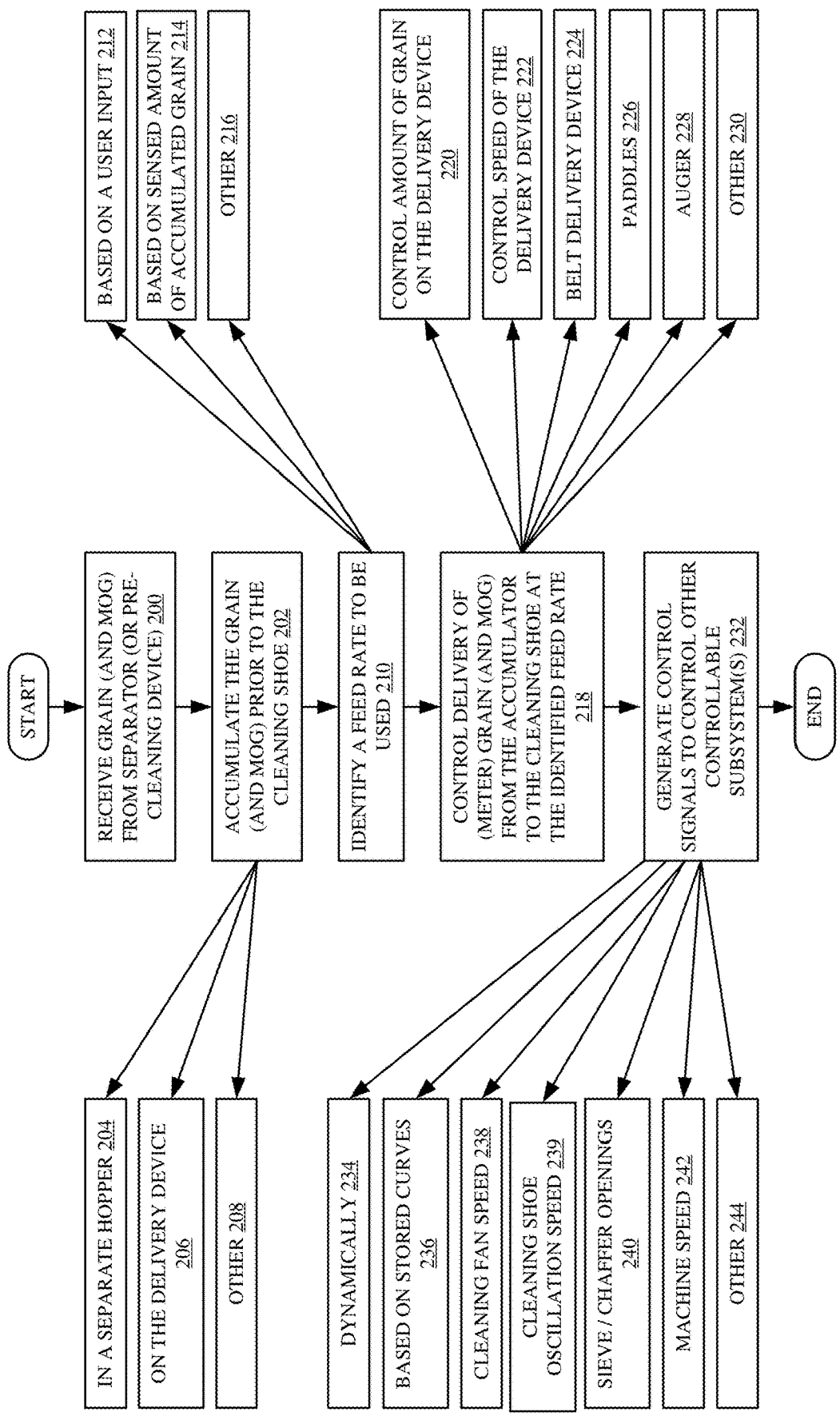
FIG. 3 is a flow diagram illustrating one example of the operation of the architecture illustrated in FIG. 2.

FIG. 3 is a flow diagram illustrating one example of the operation of the combine 100 and control system architecture 162, in more detail. In architecture 162, grain (and material other than grain-MOG) is first received from separator 110 (or another precleaning device). This is indicated by block 200 in the flow diagram of FIG. 3. The grain and material other than grain is then accumulated prior to entering the cleaning shoe 118. This is indicated by block 202. In one example, the grain and MOG is accumulated in a separate hopper, that may be separate from metering/delivery device 160. Accumulating the material in a separate hopper or other accumulator is indicated by block 204. In another example, the grain and MOG can be accumulated on the metering/delivery device, itself. Accumulating the grain on device 160 is indicated by block 206. Some examples of accumulating the grain on device 160 are described in greater detail below with respect to FIGS. 4 and 5. The grain can be accumulated in other ways as well, and this is indicated by block 208.

Feed rate generator 175 then identifies a feed rate that is to be used by metering/delivery device 160 in transporting grain to cleaning shoe 118. This is indicated by block 210 in the flow diagram of FIG. 3. This can be based on an operator input 212 where the operator sets a desired feed rate. It can also be determined automatically, for instance, based on the amount of grain sensed in the accumulator 168 by sensor 170. This is indicated by block 214. For instance, sensor 170 may sense the amount of grain building up in a hopper, or it may sense the load of grain on the metering and delivery device 160 that is moving the grain to cleaning shoe 118. Where grain is accumulating quickly in accumulator 168, the feed rate identified by feed rate generator 175 may be increased to accommodate the quickly accumulating grain, by delivering it to cleaning shoe 118 at a higher feed rate. Where it is accumulating more slowly, then the feed rate generator 175 may identify a lower feed rate. The feed rate can be identified in a variety of other ways as well, and this is indicated by block 216.

Once the feed rate is identified, metering/delivery device controller 178 illustratively generates control signals 184 to control metering/delivery device 160 to provide grain from accumulator 168 to cleaning shoe 118 at the desired feed rate. This is indicated by block 218 in the flow diagram of FIG. 3. Again, this can be based on the sensed amount of grain accumulating in accumulator 168, based on an operator input, etc. Where the accumulator 168 is separate from the metering/delivery device 160, then control signals 184 illustratively control a meter which, itself, controls the amount of grain that is placed on the delivery device, as it moves from accumulator 168 to cleaning shoe 118. By way of example, where the delivery device is a belt or a set of augers, then controller 178 illustratively controls the amount of grain that is provided from accumulator 168 to the belt or set of augers. In this way, the feed rate is controlled. This is indicated by block 220.

In another example, it may be that the accumulator 168 is actually formed by the metering/delivery device 160. For instance, it may be that metering/delivery device 160 is a flighted belt or a set of augers and the grain and MOG is freely moved on to the flighted belt or set of augers from precleaning device 166. In that case, metering/delivery device controller 178 illustratively generates control signals 184 to control the speed of the delivery device (e.g., the flighted belt or set of augers) based upon the amount of grain and MOG loaded onto that delivery device, and sensed by sensor 170, in order to control the feed rate. By way of example, it may be that the set of augers includes a load sensor that senses the amount of grain in the augers at a given time. A flighted belt delivery device may include an optical sensor, or another sensor, that senses the amount of grain in each flight defined by the flighted belt, and controller 178 controls the speed of the delivery device, based on the amount of grain and MOG on the delivery device (e.g., on the flighted belt or on the augers) so that the identified feed rate is achieved. Controlling the speed of the delivery device in order to meter harvested material (e.g., grain and MOG) to cleaning shoe 118, at a desired feed rate, is indicated by block 222.

Again, the delivery device may be a belt delivery device 224 where the amount of grain on the belt is sensed by a load sensor, an optical sensor, etc. It may be a belt with a set of paddles 226. It may be an auger 228 or a set of augers, or it may be a wide variety of other items 230. Regardless of the particular configuration of accumulator 168 and metering/delivery device 160, metering/delivery device controller 170 illustratively controls those systems (whether they are integrated into a single device or separate devices) to deliver grain to cleaning shoe 118 at a desired feed rate.

Because meter control system 172 knows the particular feed rate at which grain is being delivered to cleaning shoe 118, subsystem controller 180 can then generate control signals 185 to control any of a wide variety of different subsystems based on the particular feed rate. In one example, the settings for the controllable subsystems are mapped to different feed rates by feed rate-to-settings mappings 176. Therefore, subsystem controller 180 can receive an indication of the particular feed rate at which grain is being feed to cleaning shoe 118, by feed rate generator 175. It then illustratively accesses mappings 176 to obtain a set of subsystem settings that are to be applied to the controllable subsystems based upon that particular feed rate. In one example, mappings 176 can be a set of curves, they can be arranged in a look up table, etc. One example of such mappings 176 is described in greater detail below with respect to FIG. 6. Having subsystem controller 180 generate control signals 184 to control a variety of different controllable subsystems on combine 100 is indicated by block 232 in the flow diagram of FIG. 3.

It will be noted that, while mappings 176 are discussed herein, the settings or control signals can be generated dynamically as well. This is indicated by block 234. For instance, as the field conditions change and the feed rate changes, it may be that the particular settings that are used to control the controllable subsystems change dynamically. Thus, mappings 176 may not be needed. However, identifying the settings and controlling the subsystems based on a set of stored curves or other mappings is indicated by block 236.

Also, the controllable subsystems for which control signals 185 can be generated can be a wide variety of different subsystems. For instance, control signals 185 can be generated to control fan speed of cleaning shoe fan 120. This is indicated by block 238. Control signals can be generated to control a speed of oscillation of the cleaning shoe 118. This is indicated by block 239. Control signals 185 can be generated to control the sieve and chaffer openings. This is indicated by block 240. Control signals 185 can be generated to automatically control the speed of harvester 100. This is indicated by block 242. A wide variety of other control signals can be generated to control a wide variety of other controllable subsystems as well, and this is indicated by block 244.

Figure 4:
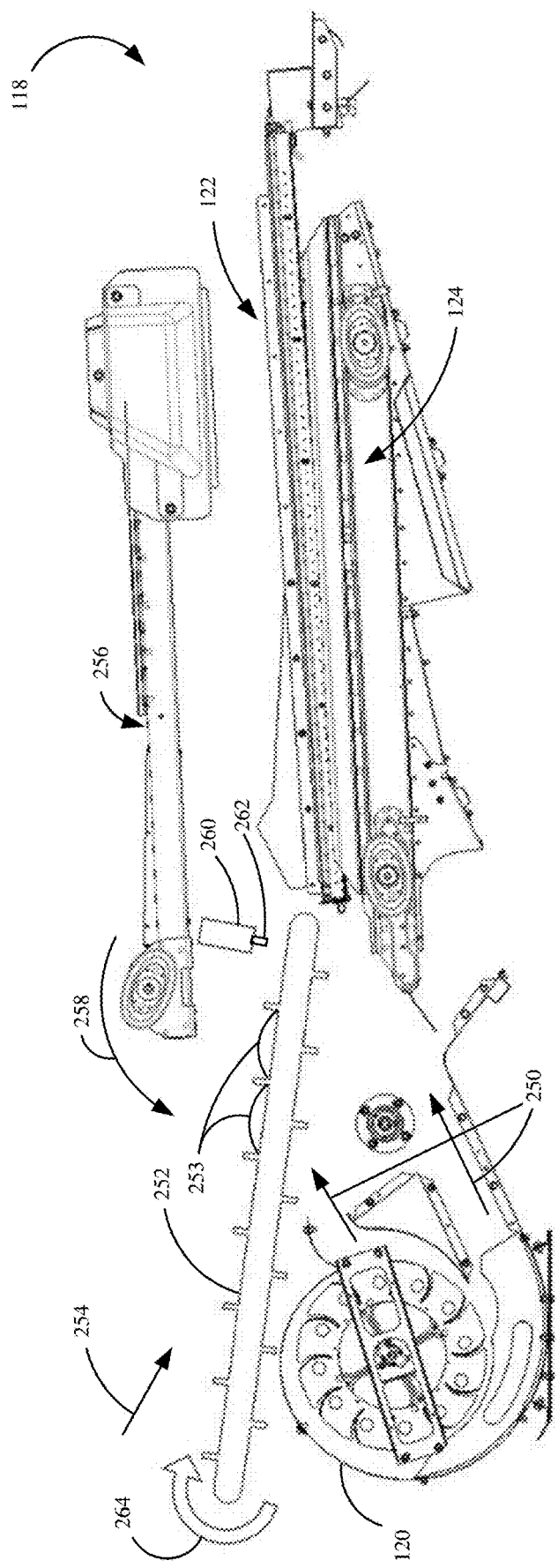
FIGS. 4 and 5 are examples of different storage devices and metering/delivery devices used to meter delivery of harvested material to a cleaning shoe.
Figure 5:
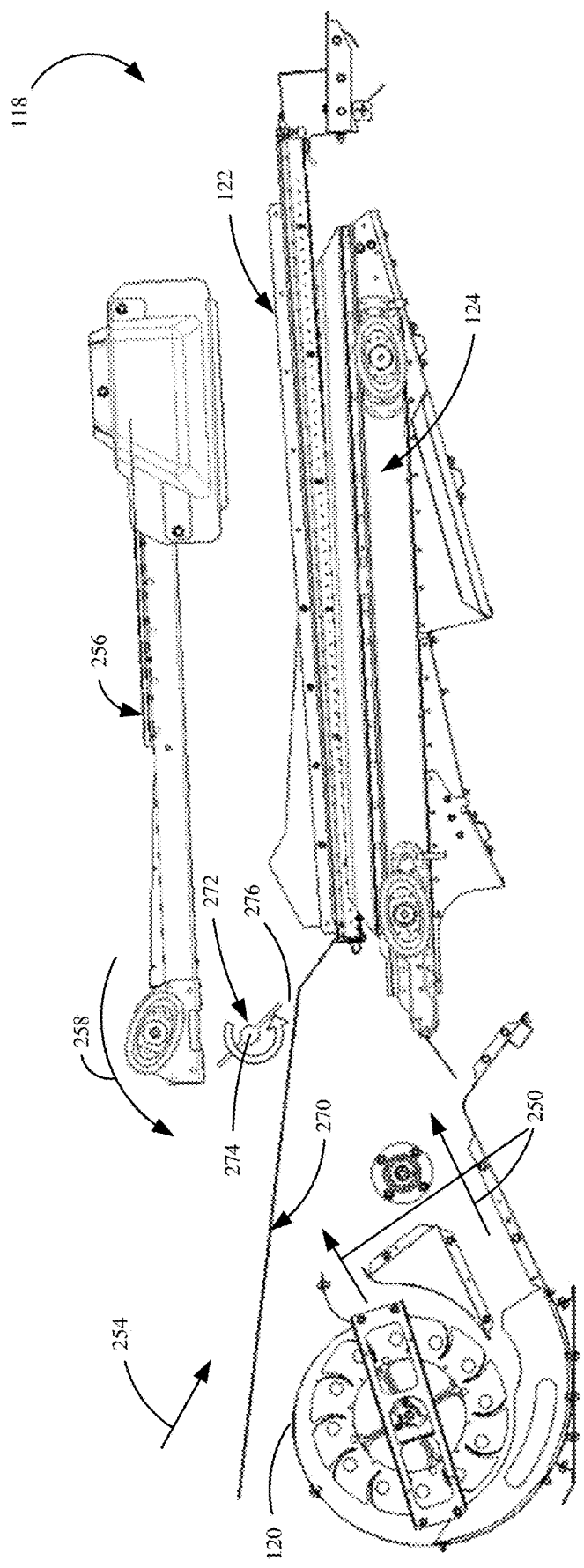

FIGS. 4 and 5 show two examples of how grain can be accumulated and metered to cleaning shoe 118. FIG. 4 shows some items which are the same as those illustrated in FIG. 1. In FIG. 4, cleaning shoe 118 is shown with chaffer and sieve 122 and 124, respectively. Cleaning shoe fan 120 illustratively generates air flow through the cleaning shoe 118 in the direction generally indicated by arrows 250. A flighted belt (or belt with paddles) 252 illustratively receives grain and MOG from separator 110 generally in the direction indicated by arrow 254. A conveyance mechanism 256 which may catch grain and MOG that is conveyed out of the back of separator 110, and it transports that material, generally in the direction indicated by arrow 258, back to flighted belt 252. FIG. 4 shows that flighted belt 252 can be positioned proximate a door or scraper 260 that has a depending portion 262 that can be extended and retracted in order to allow more, or less, grain and MOG to be deposited by flighted belt 252 onto cleaning shoe 118. As shown, flighted belt 252 rotates generally in the direction indicated by arrow 264 so that, as grain is deposited on it, it moves the grain toward an inlet side of cleaning shoe 118.

In another example, device 260 does not include a scraper or dependable portion 262, but is instead a sensor which senses the height of grain and MOG 253 on belt 252. The control signals 184 are then generated to vary the speed of belt 252, based upon the sensed amount of grain on flighted belt 252, in order to achieve the desired feed rate into cleaning shoe 118.

In yet another example, a sensor, such as a load sensor, can be disposed relative to flighted belt 252 to sense the load on flighted belt 252, which is indicative of the amount of material being conveyed into cleaning shoe 118. Again, control signals 184 can be generated to vary the speed of rotation of belt 252, based upon the sensed load, in order to maintain a desired feed rate into cleaning shoe 118. In these examples, the belt 252 acts as both the accumulator 168 and the delivery device 160. Grain and MOG are accumulated on belt 252 and delivered to an inlet side of cleaning shoe 118 at a desired feed rate.

FIG. 5 shows another example of how grain can be metered into cleaning shoe 118. In the example shown in FIG. 5, some elements are the same as those shown in FIG. 4, and they are similar numbered. However, in the example shown in FIG. 5, a delivery device 270 may illustratively be a belt device, a set of augers, or a gravity feed arrangement where grain and material other than grain is deposited on delivery device 270 from the separator 110 and transport mechanism 256 generally in the directions indicated by arrows 254 and 258, respectively. The example shown in FIG. 5 also includes a door 272 that is controllably pivotable about pivot point 274. The amount of opening 276 defined by the door is dependent upon the extent to which it is rotated about pivot point 274. Therefore, the amount of material conveyed to cleaning shoe 118 can be regulated based upon the position of door 272.

The transport mechanism 270 can thus act as the accumulator as well as the delivery device. For instance, it may be that material builds up on device 270 and the amount of material on device 270 is sensed by sensor 170 (shown in FIG. 2). The position of door 272 can be varied based upon whether the amount of grain on device 270 is accumulating quickly, slowly, or is relatively constant. The speed of delivery device 270 can also be varied to accommodate for the amount of material on device 270. Similarly, the position of door 272 can be varied. All of these items can be sensed and changed in order to vary the feed rate (or to maintain a desired feed rate) of material into cleaning shoe 118. By way of example, if material is accumulating relatively slowly on device 270, then the speed of device 270 can be reduced, the speed of harvester 100 can be increased, etc. Again, the sensor can be an optical sensor sensing the height of material on device 270, it can be a load sensor, or it can be any of a wide variety of other sensors.

Figure 6:
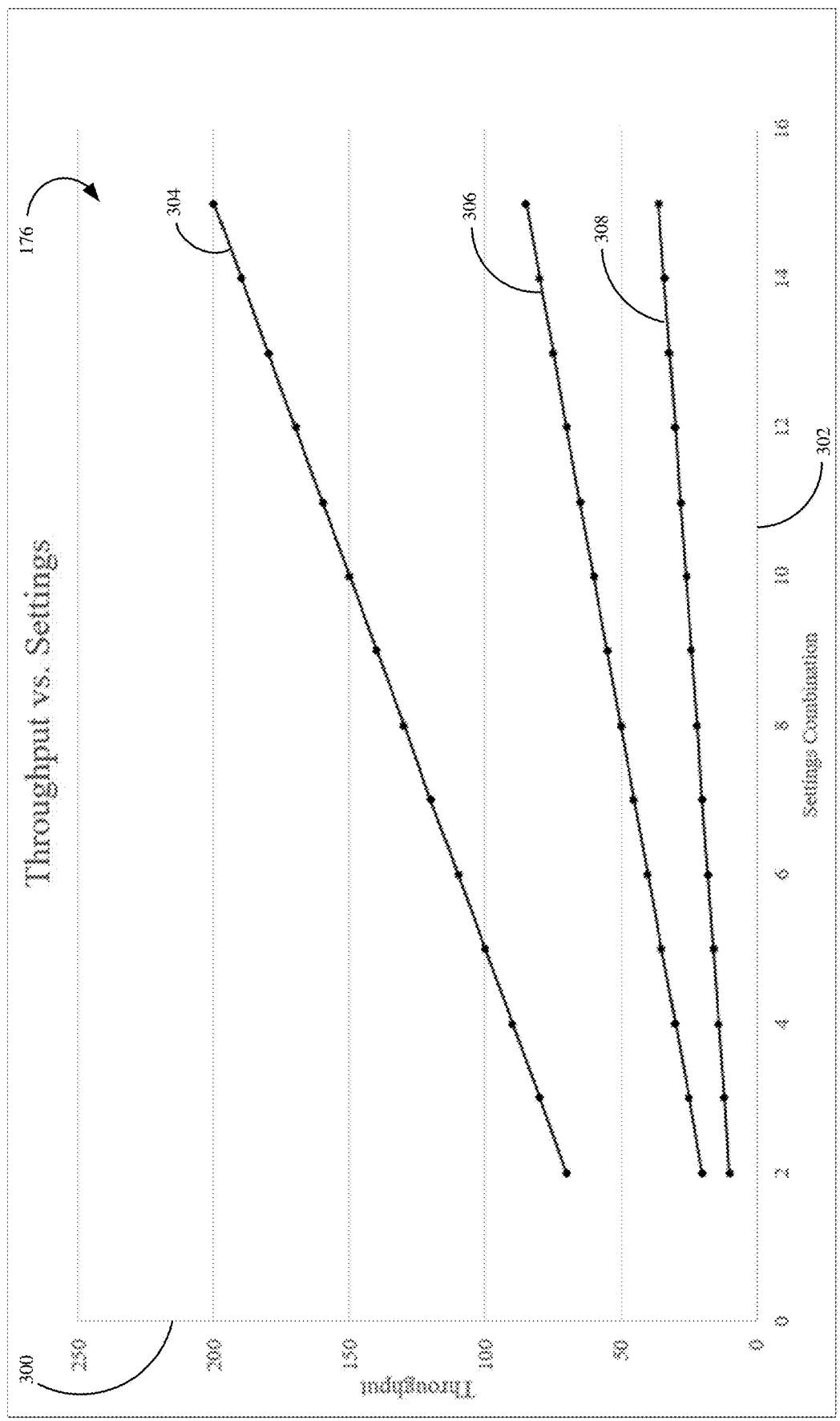
FIG. 6 shows one example of a set of feed rate-to-settings mappings.

FIG. 6 shows one example of a set of feed rate-to-settings mappings 176. It can be seen in FIG. 6 that the feed rate (or throughput) is plotted along the y axis 300 while the combination of settings can be plotted along the x axis 302. In the example illustrated, a set of mappings (or a feed rate-to-settings curve) is stored for each of a plurality of different crops. Curve 304, for instance, may be used when harvesting corn, while curves 306 and 308 may be used while harvesting wheat and canola, respectively. When a setting combination identifier is obtained from the x axis 302 (once the throughput or feed rate is identified on the y axis), the setting combination identifier on the x axis 302 may point to a group of settings in a separate memory, which can be obtained and used in generating control signals 184 and 185 to control combine harvester 100. The settings may be for the cleaning shoe fan speed, for the sieve and chaffer openings, for the metering/delivery device, for machine speed, or for any of a wide variety of other controllable subsystems. Of course, it will be noted that the curves or mappings 176 shown in FIG. 6 are shown by way of example only.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures.

Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
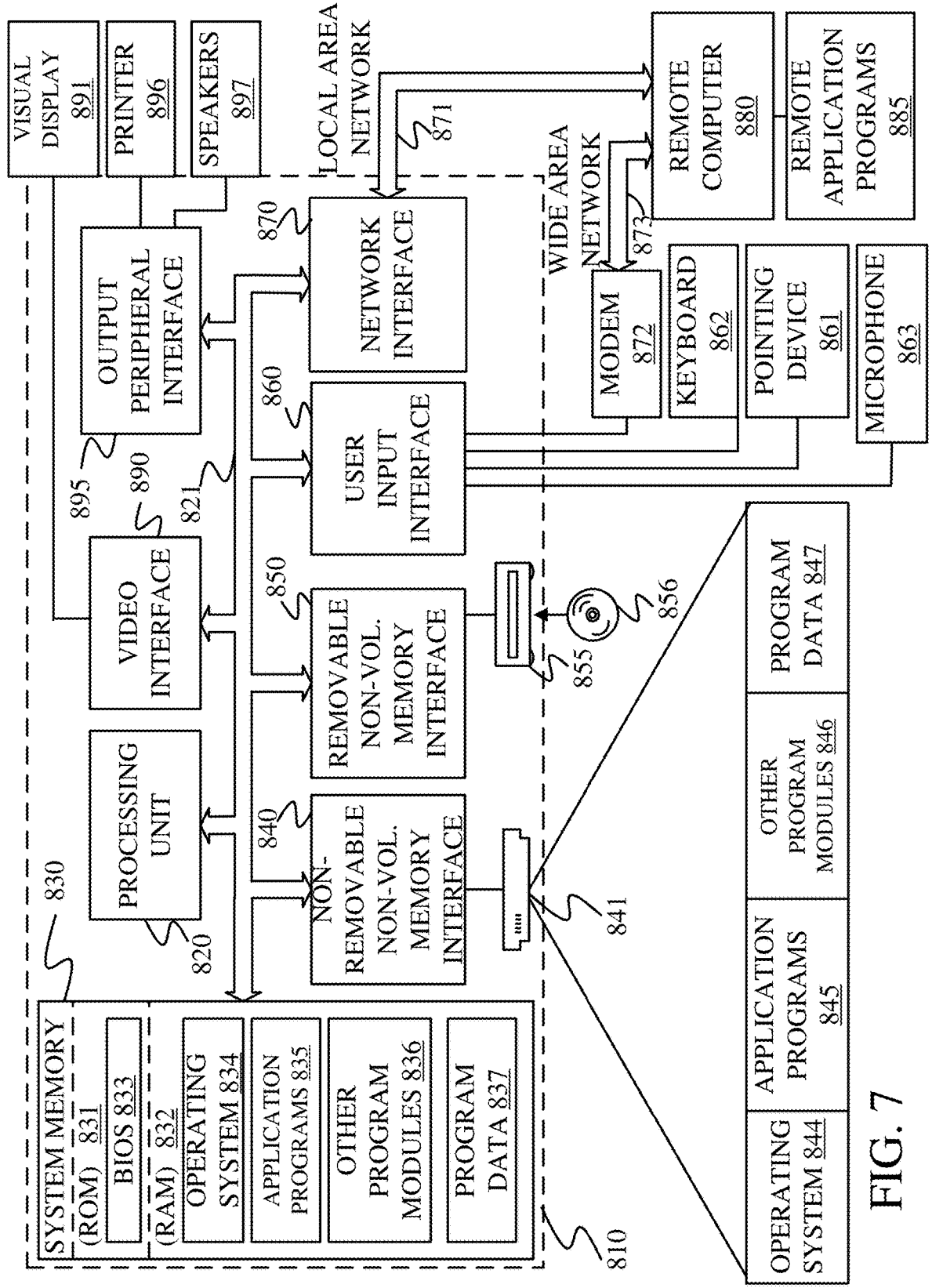
FIG. 7 is a block diagram of one example of a computing environment that can be used in the architectures shown in the previous Figures.

FIG. 7 is one example of a computing environment in which elements of FIGS. 1 and 2, or parts of them, (for example) can be deployed. With reference to FIG. 7, an example system for implementing some embodiments includes a general-purpose computing device in the form of a computer 810. Components of computer 810 may include, but are not limited to, a processing unit 820 (which can comprise processor(s) from previous FIGS.), a system memory 830, and a system bus 821 that couples various system components including the system memory to the processing unit 820. The system bus 821 may be any of several types of bus structures including a controller area network (CAN) bus, a memory bus or memory controller, a peripheral bus, and a local bus using any of a variety of bus architectures of combinations of bus architectures. Memory and programs described with respect to FIG. 2 can be deployed in corresponding portions of FIG. 7. When used on a vehicle, such as a tractor or combine harvester, computer 810 can also include a wide variety of other sensors, controllers, controllable subsystems, etc.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile harvesting machine, comprising:
a cleaning shoe, having an inlet side configured to receive harvested material, the cleaning shoe being configured to clean the harvested material;
a delivery system that delivers the harvested material to the inlet side of the cleaning shoe; and
a control system that generates a delivery control signal to control the delivery system to deliver the harvested material to the inlet side of the cleaning shoe at a feed rate, and that generates a cleaning shoe control signal to control the cleaning shoe based on the feed rate.

Example 2 is the mobile harvesting machine of any or all previous examples wherein the delivery system comprises:
a movable delivery device that conveys the harvested material to the inlet side of the cleaning shoe.

Example 3 is the mobile harvesting machine of any or all previous examples wherein the delivery system comprises:
an accumulator configured to accumulate the harvested material before it is delivered to the inlet side of the cleaning shoe.

Example 4 is the mobile harvesting machine of any or all previous examples wherein the control system comprises:
a sensor configured to sense an amount of the harvested material that is accumulated in the accumulator, and wherein the control system is configured to generate the delivery control signal based on the sensed amount.

Example 5 is the mobile harvesting machine of any or all previous examples wherein the accumulator comprises:
a separate hopper, separate from the movable delivery device, that provides the accumulated, harvested material to the delivery device for delivery to the inlet side of the cleaning shoe.

Example 6 is the mobile harvesting machine of any or all previous examples wherein the accumulator comprises a part of the movable delivery device.

Example 7 is the mobile harvesting machine of any or all previous examples wherein the movable delivery device comprises an auger.

Example 8 is the mobile harvesting machine of any or all previous examples wherein the movable delivery device comprises:
a belt with paddles defining material carrying areas.

Example 9 is the mobile harvesting machine of any or all previous examples wherein the sensor is configured to sense an amount of harvested material carried by each of the material carrying areas and wherein the control system generates the delivery the control signal to control a speed of the belt to provide the harvested material to the inlet side of the cleaning shoe at the feed rate.

Example 10 is the mobile harvesting machine of any or all previous examples wherein the control system comprises:
a subsystem controller configured to generate a cleaning shoe control signal to control the cleaning shoe based on the feed rate.

Example 11 is the mobile harvesting machine of any or all previous examples wherein the control system comprises:
a set of feed rate-to-settings mappings that map the feed rate to a group of settings for the cleaning shoe.

Example 12 is the mobile harvesting machine of any or all previous examples wherein the delivery system comprises:
a material load control device that controls a load of the harvested material carried by the movable delivery device.

Example 13 is a grain cleaning system on a mobile harvesting machine, the grain cleaning system comprising:
a cleaning shoe, having an inlet side configured to receive harvested material, the cleaning shoe being configured to clean the harvested material;
a delivery system that delivers the harvested material to the inlet side of the cleaning shoe;
a sensor that senses an amount of harvested material being delivered to the inlet side of the cleaning show by the delivery system and that generates a sensor signal indicative of the sensed amount; and
a control system that generates a delivery control signal to control the delivery system, based on the sensed amount indicated by the sensor signal, to deliver the harvested material to the inlet side of the cleaning shoe at a feed rate, the control system generating a cleaning shoe control signal to control the cleaning shoe based on the feed rate.

Example 14 is the grain cleaning system of any or all previous examples wherein the cleaning shoe oscillates at an oscillation speed and comprises:
a sieve;
a chaffer; and
a cleaning shoe fan, and wherein the control system is configured to generate the cleaning shoe control signal to control at least one of the oscillation speed, an opening size of openings in the sieve, an opening size of openings in the chaffer, or a fan speed of the cleaning shoe fan, based on the feed rate.

Example 15 is the grain cleaning system of any or all previous examples wherein the delivery system comprises:
an accumulator configured to accumulate the harvested material before it is delivered to the inlet side of the cleaning shoe.

Example 16 is a method of controlling a mobile harvesting machine, comprising:
accumulating harvested material on an inlet side of a cleaning shoe on the mobile harvesting machine;
controllably delivering the accumulated, harvested material to the inlet side of the cleaning shoe at a feed rate; and
generating a cleaning shoe control signal to control the cleaning shoe based on the feed rate.

Example 17 is the method of any or all previous examples wherein the cleaning shoe comprise a sieve having controllable sieve openings, a chaffer having controllable chaffer openings, and a cleaning shoe fan that runs at a controllable fan speed, and wherein generating a cleaning shoe control signal comprises:
generate a sieve control signal to control an opening size of the sieve openings;
generating a chaffer control; signal to control an opening size of the chaffer openings; and
generating a fan speed signal to control the fan speed of the cleaning shoe fan.

Example 18 is the method of any or all previous examples wherein controllably delivering comprises:
sensing an amount of the harvested material accumulated on a movable delivery device that conveys the harvested material to the inlet side of the cleaning shoe; and
controlling the movable delivery device based on the sensed amount.

Example 19 is the method of any or all previous examples wherein controlling the movable delivery device comprises:
controlling an amount of the harvested material on the movable delivery device.

Example 20 is the method of any or all previous examples wherein controlling the movable delivery device comprises:
controlling a speed at which the movable delivery device conveys the harvested material to the inlet side of the cleaning shoe.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile harvesting machine, comprising:
a cleaning shoe having
an inlet side configured to receive harvested material, and at least one controllable subsystems configured to clean the harvested material;
a delivery device that delivers the harvested material to the inlet side of the cleaning shoe; and
a control system that
generates a delivery control signal to control the delivery device to deliver the harvested material to the inlet side of the cleaning shoe,
determines a feed rate at which the harvested material, delivered to the inlet side of the cleaning shoe, is fed into the cleaning shoe, and
generates a cleaning shoe control signal to control at least one of the controllable subsystems of the cleaning shoe based on the feed rate.

2. The mobile harvesting machine of claim 1 wherein the delivery device comprises:
a movable delivery device that conveys the harvested material to the inlet side of the cleaning shoe.

3. The mobile harvesting machine of claim 2 wherein the delivery device comprises:
an accumulator configured to accumulate the harvested material before it is delivered to the inlet side of the cleaning shoe.

4. The mobile harvesting machine of claim 3 wherein the control system comprises:
a sensor configured to sense an amount of the harvested material that is accumulated in the accumulator, and wherein the control system is configured to generate the delivery control signal based on the sensed amount.

5. The mobile harvesting machine of claim 4 wherein the accumulator comprises:
a separate hopper, separate from the movable delivery device, that provides the accumulated, harvested material to the delivery device for delivery to the inlet side of the cleaning shoe.

6. The mobile harvesting machine of claim 4 wherein the accumulator comprises a part of the movable delivery device.

7. The mobile harvesting machine of claim 6 wherein the movable delivery device comprises an auger.

8. The mobile harvesting machine of claim 6 wherein the movable delivery device comprises:
a belt with paddles defining material carrying areas.

9. The mobile harvesting machine of claim 8 wherein the sensor is configured to sense an amount of harvested material carried by each of the material carrying areas and wherein the control system generates the delivery the control signal to control a speed of the belt to provide the harvested material to the inlet side of the cleaning shoe at the feed rate.

10. The mobile harvesting machine of claim 4 wherein the control system comprises:
a subsystem controller configured to generate a cleaning shoe control signal to control the cleaning shoe based on the feed rate.

11. The mobile harvesting machine of claim 10 wherein the control system comprises:
a set of feed rate-to-settings mappings that map the feed rate to a group of settings for the cleaning shoe.

12. A grain cleaning system on a mobile harvesting machine, the grain cleaning system comprising:
a cleaning shoe, having an inlet side configured to receive harvested material, the cleaning shoe being configured to clean the harvested material, the cleaning shoe configured to oscillate at an oscillation speed and comprising:
a sieve;
a chaffer; and
a cleaning shoe fan;
a delivery device that delivers the harvested material to the inlet side of the cleaning shoe;
a sensor that senses an amount of harvested material being delivered to the inlet side of the cleaning shoe by the delivery system and that generates a sensor signal indicative of the sensed amount; and
a control system that generates a delivery control signal to control the delivery device, based on the sensed amount indicated by the sensor signal, to deliver the harvested material to the inlet side of the cleaning shoe at a feed rate, the control system generating a cleaning shoe control signal to control the cleaning shoe based on the feed rate, wherein the control system is configured to generate the cleaning shoe control signal to control at least one of the oscillation speed, an opening size of openings in the sieve, an opening size of openings in the chaffer, or a fan speed of the cleaning shoe fan, based on the feed rate.

13. The grain cleaning system of claim 12 wherein the delivery device comprises:
an accumulator configured to accumulate the harvested material before it is delivered to the inlet side of the cleaning shoe.

14. A method of controlling a mobile harvesting machine, comprising:
accumulating harvested material on an inlet side of a cleaning shoe on the mobile harvesting machine, wherein the cleaning shoe comprises a sieve having controllable sieve openings, a chaffer having controllable chaffer openings, and a cleaning shoe fan that runs at a controllable fan speed;
controllably delivering the accumulated, harvested material to the inlet side of the cleaning shoe at a feed rate; and
generating a cleaning shoe control signal to control the cleaning shoe based on the feed rate, wherein the control signal controls at least one of an opening size of the sieve openings, an opening size of the chaffer openings, or a fan speed of the cleaning shoe fan.

15. The method of claim 14 wherein controllably delivering comprises:
sensing an amount of the harvested material accumulated on a movable delivery device that conveys the harvested material to the inlet side of the cleaning shoe; and
controlling the movable delivery device based on the sensed amount.

16. The method of claim 15 wherein controlling the movable delivery device comprises:

controlling an amount of the harvested material on the movable delivery device.

17. The method of claim 15 wherein controlling the movable delivery device comprises:

controlling a speed at which the movable delivery device conveys the harvested material to the inlet side of the cleaning shoe.

\* \* \* \* \*